(12) United States Patent
Kone et al.

(10) Patent No.: US 8,095,106 B2
(45) Date of Patent: Jan. 10, 2012

(54) SYSTEM AND METHOD FOR POWER SAVINGS IN A WIRELESS COMMUNICATION NETWORK

(75) Inventors: Mamadou Kone, Hsinchu (TW); Hung-Jie Yen, Hsinchu (TW); Yu-Min Chiu, Hsinchu (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 935 days.

(21) Appl. No.: 12/068,986

(22) Filed: Feb. 14, 2008

(65) Prior Publication Data

US 2009/0209223 A1 Aug. 20, 2009

(51) Int. Cl.
*H04B 1/16* (2006.01)
(52) U.S. Cl. ............... 455/343.1; 455/343.2; 455/343.3; 455/343.5; 455/574; 370/311; 370/328; 370/329
(58) Field of Classification Search ............... 455/343.1, 455/343.2, 343.4, 343.5, 574; 370/311, 328, 370/329
See application file for complete search history.

(56) References Cited

U.S. PATENT DOCUMENTS

| | | | | |
|---|---|---|---|---|
| 7,130,668 B2* | 10/2006 | Chang et al. | | 455/574 |
| 7,430,421 B2* | 9/2008 | Park | | 455/456.1 |
| 7,672,696 B2* | 3/2010 | Lee et al. | | 455/574 |
| 7,688,784 B2* | 3/2010 | Bitran et al. | | 370/329 |
| 7,751,858 B2* | 7/2010 | Chou | | 455/574 |
| 2005/0054389 A1* | 3/2005 | Lee et al. | | 455/574 |
| 2005/0070340 A1* | 3/2005 | Kim | | 455/574 |
| 2006/0281436 A1 | 12/2006 | Kim et al. | | |
| 2007/0072578 A1 | 3/2007 | Lee et al. | | |
| 2007/0218939 A1 | 9/2007 | Lim et al. | | |
| 2008/0182567 A1* | 7/2008 | Zhu et al. | | 455/418 |
| 2009/0209223 A1* | 8/2009 | Kone et al. | | 455/343.1 |

OTHER PUBLICATIONS

LAN/MAN Standards Committee, IEEE Std 802.16e™-2005 and IEEE Std 802.16™-2004/Cor1-2005, Feb. 28, 2006, New York, NY.

* cited by examiner

*Primary Examiner* — Sanh Phu
(74) *Attorney, Agent, or Firm* — Finnegan, Henderson, Farabow, Garrett & Dunner, LLP

(57) ABSTRACT

A method for power savings in a wireless communications network including selecting one or more connections with common performance characteristics to create a plurality of power savings classes, attributing a power savings window size to each power savings class, and aligning power savings classes with the same start time to generate an aligned power savings class. In addition, the method includes communicating the plurality of power savings classes and each associated power savings window size to a base station.

22 Claims, 10 Drawing Sheets

QoS Services

| Service | Definition | Applications | Mandatory QoS Parameters |
|---|---|---|---|
| UGS | Real-time data streams comprising fixed-size data packets issued at periodic intervals | T1/E1, VoIP without Silence Suppression | Maximum Sustained Traffic Rate (= Minimum Reserved Traffic Rate) Maximum Latency Tolerated Jitter Request/Transmission Policy Unsolicited Grant interval |
| ERT-VR | Real-time service flows that generate variable-sized data packets on a periodic basis | VoIP with Silence Suppression | Maximum Sustained Traffic Rate Minimum Reserved Traffic Rate Maximum Latency Request/Transmission Policy Unsolicited Polling Interval |
| RT-VR | Real-time data streams comprising variable-sized data packets that are issued at periodic intervals | MPEG Video | Minimum Reserved Traffic Rate Maximum Sustained Traffic Rate Maximum Latency Traffic Priority Request/Transmission Policy Unsolicited Polling Interval(O) |
| NRT-VR | Delay-tolerant data streams comprising variable-sized data packets for which minimum data rate is required | FTP | Minimum Reserved Traffic Rate Maximum Sustained Traffic Rate Traffic Priority Request/Transmission Policy |
| BE | Data streams for which no minimum service level is required and therefore may be handled on a space-available basis | HTTP | Maximum Sustained Traffic Rate Traffic Priority Request/Transmission Policy |

FIG. 4

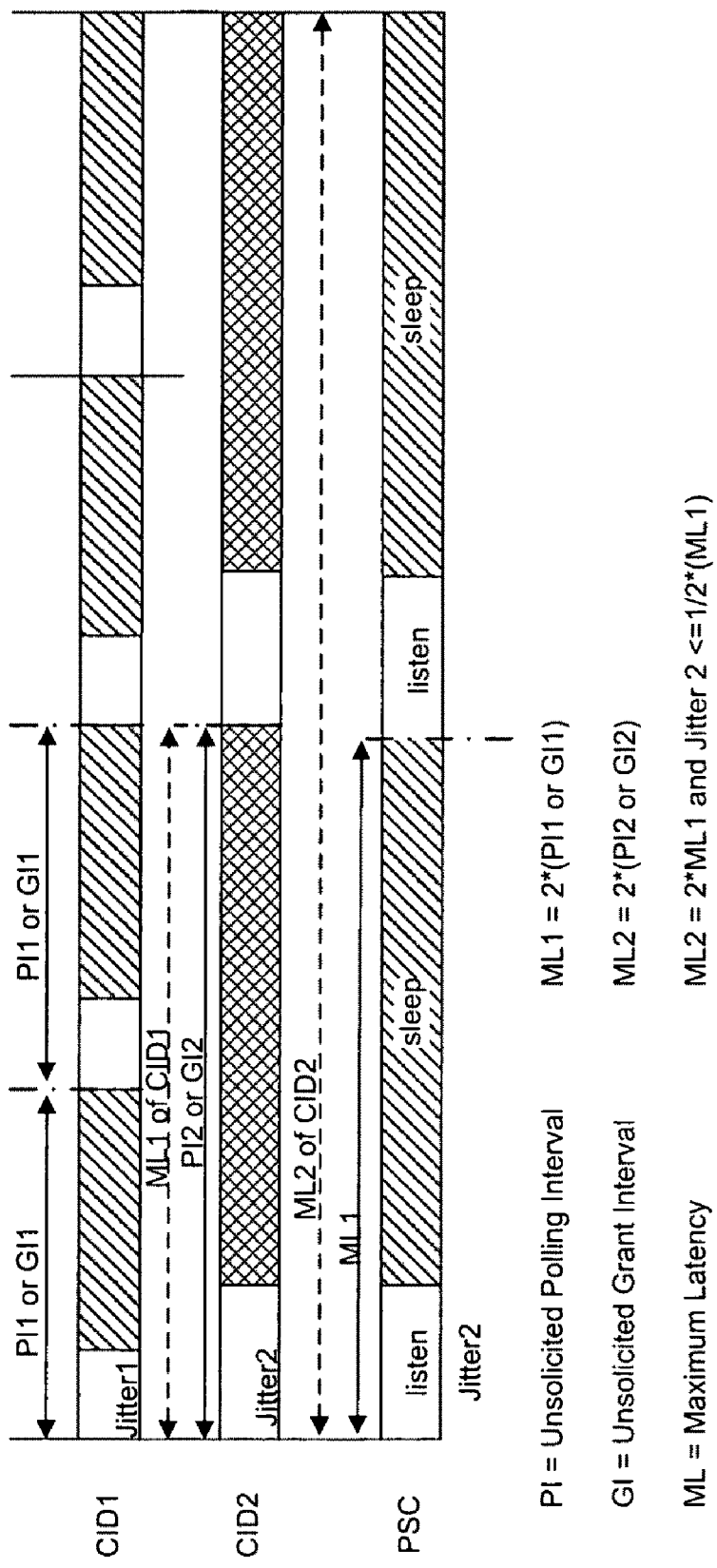

Connections grouping according to MLs and PI/GIs (Hybrid class)

SYSTEM AND METHOD FOR POWER SAVINGS IN A WIRELESS COMMUNICATION NETWORK

TECHNICAL FIELD

The present disclosure relates generally to methods and devices for wireless communication systems and, more particularly, to methods and devices for wireless communication systems to provide power savings.

BACKGROUND

Due to an increasing number of wireless devices and a growing demand for wireless services, wireless communication systems continue to expand. To meet the growing demand, and to increase interoperability and reduce costs, various sets of standards have been introduced for wireless communications. One such set of standards developed for wireless communication is IEEE 802.16. IEEE 802.16 includes the family of standards developed by the IEEE 802.16 committee, establishing standards for broadband wireless access. In part, the IEEE 802.16 family of standards defines interoperability of broadband Wireless Metropolitan Area Networks (WirelessMAN). Generally speaking, WirelessMANs are typically large networks utilizing wireless infrastructure to form connections between subscriber stations. Wi-Max, a term defined and promoted by The Wi-Max Forum™, is commonly used to refer to WirelessMANs and wireless communication and communication networks that are based on the IEEE 802.16 standard. As used herein, the term "Wi-Max" refers to any communication network, system, apparatus, device, method, etc. that utilizes or is based on the 802.16 family of standards.

IEEE 802.16e supports Quality of Service (QoS) by providing various service classes to services with different characteristics. The service classes in IEEE 802.16e have been designed to support real-time applications such as voice and video and non-real-time application such as large file transfer. Different kinds of traffic supported by an IEEE 802.16e network are classified into one of the following services: (1) Unsolicited Grant Service (UGS) (2) Real-time Polling Service (RT-VR) (3) Extended Real-time Service (ERT-VR) (4) Non-Real-time Polling Service (NRT-VR) and (5) Best Effort Service (BE).

The standard provides specifications for these different services, but does not specify any scheduling architecture. QoS support in wireless networks is a more difficult task than in wired networks, because the characteristics of a wireless link are variable and unpredictable. To cope with the unpredictability, QoS in wireless networks is usually managed at the medium access control (MAC) layer. In addition to scheduling, a Power Saving Mode (PSM) is also a part of IEEE 802.16e. A PSM provides energy savings on a mobile station when the traffic load is low. PSM consists of alternating sleep intervals and listen intervals. Generally, during the sleep interval the device cuts off all contact with its serving base station and saves its energy. During the listening interval, the device waits for traffic or sends packets out. The procedure of sleep mode described in IEEE 802.16e consists of grouping connections according to their QoS types to create Power Saving Classes (PSCs).

In this regard, IEEE 802.16 enumerates three kinds of Power saving classes:

Power Saving Class I (PSC I): Groups NRT-VR and BE connections

Power Saving Class II (PSC II): Groups UGS, ERT-VR and RT-VR connections

Power Saving Class III (PSC III): Groups multicast connections and management connections Each type of PSC has a set of message exchange procedures for its definition/activation/deactivation. Moreover, IEEE 802.16e defines a general set of parameters and rules that can be used to design their different windows. For the specific case of PSC I there is a proposed formula for calculating sleep window size according to traffic presence.

However, there is a need to define a robust, QoS-aware and efficient method of scheduling and power savings. Without efficient scheduling there is no guarantee of QoS and throughput is compromised and, without a robust PSM, energy saving may be not optimal.

The IEEE 802.16e standard proposes a general concept of design and maintenance of Power Saving Classes, without any in-depth description.

The disclosed embodiments are directed to overcoming one or more of the problems set forth above.

SUMMARY OF THE INVENTION

In one exemplary embodiment, the present disclosure is directed to a method for power savings in a wireless communications network, comprising: selecting one or more connections with common performance characteristics to create a plurality of power savings classes; attributing a power savings window size to each power savings class; aligning power savings classes with the same start time to generate an aligned power savings class; and communicating the plurality of power savings classes and each associated power savings window size to a base station.

In another exemplary embodiment, the present disclosure is directed to a wireless communication mobile station for wireless communication, the wireless communication mobile station comprising: at least one memory to store data and instructions and at least one processor configured to access the memory and execute the instructions. The at least one processor when executing the instructions further comprises: determine a number and type of connections, select one or more of the connections with common performance characteristics to create a plurality of power savings classes, attribute a power savings window size to each power savings class, align power savings classes with the same start time to generate an aligned power savings class, and communicating the plurality of power savings classes and each associated power savings window size to a base station.

In another exemplary embodiment, the present disclosure is directed to a computer-readable medium including instructions for performing a method, when executed by a processor, for power savings in a wireless communications network, the method comprising: determining a number and type of connections; selecting one or more of the connections with common performance characteristics to create a plurality of power savings classes; attributing a power savings window size to each power savings class; aligning power savings classes with the same start time to generate an aligned power savings class; and communicating the plurality of power savings classes and each associated power savings window size to a base station.

BRIEF DESCRIPTION OF THE DRAWINGS

FIG. 4 is a table illustrating an exemplary set of types of services for a Quality of Service (QoS) standard, consistent with certain disclosed embodiments;

FIG. 6 is an exemplary diagram including a horizontal time axis, illustrating determination of sleep and listen windows for a pure power savings class according to maximum latencies and jitters, consistent with certain disclosed embodiments;

DETAILED DESCRIPTION

Figure 1:
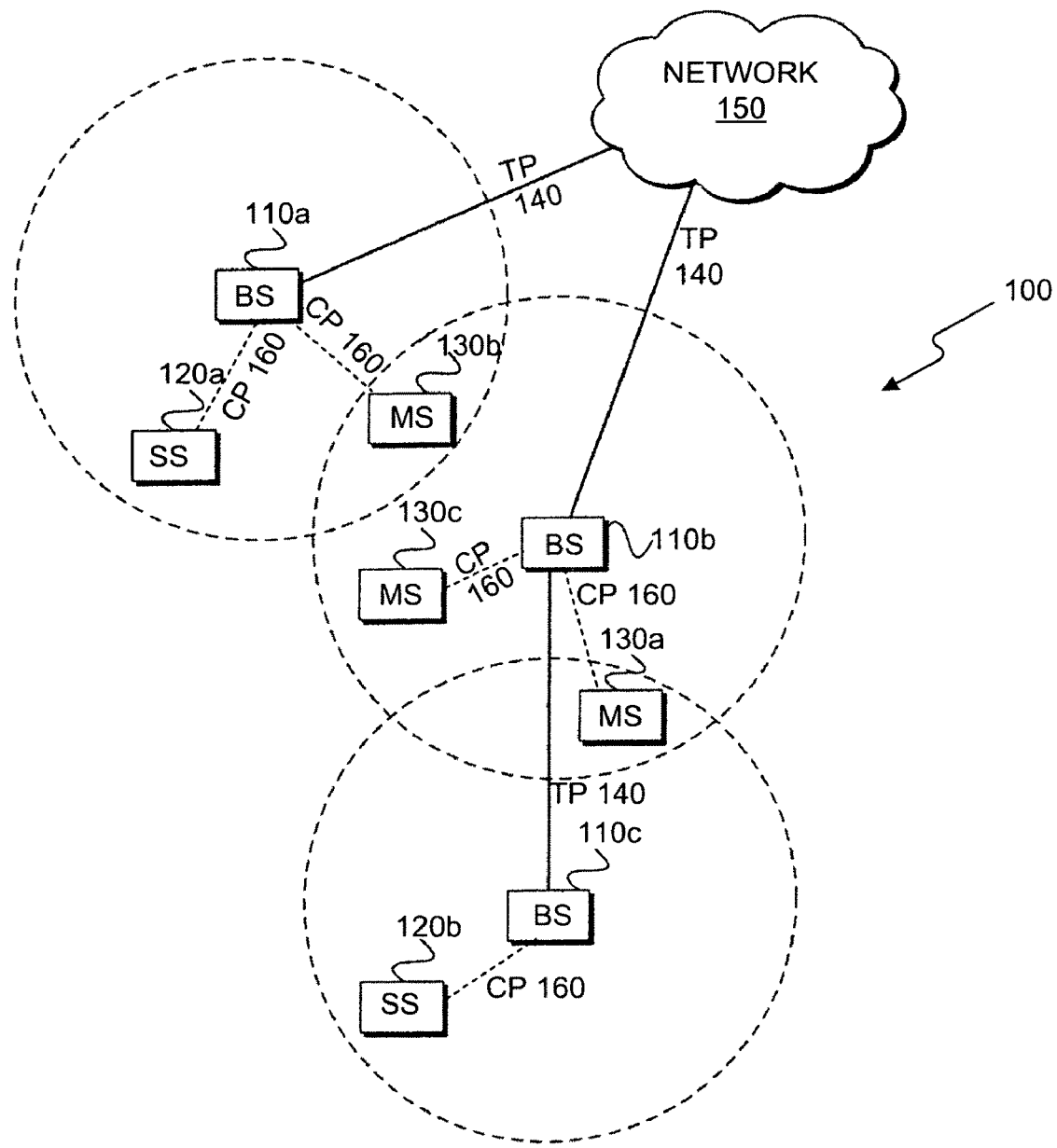
FIG. 1 is a block diagram of an exemplary Wi-Max network.

While the discussion of FIG. 1 will be made with reference to the IEEE 802.16 family of standards, it is to be understood that the systems and methods disclosed herein may be used in any type of network having a plurality of nodes and remote communication stations. FIG. 1 is a block diagram of an exemplary Wi-Max network 100 based on the 802.16 family of standards, consistent with certain disclosed embodiments. As shown in FIG. 1, Wi-Max network 100 may include one or more transmitters, e.g., Base Stations (BS) 110, including BSs 110a, 110b, and 110c, one or more receivers, e.g., stationary stations (SS) 120, including SSs 120a and 120b, and mobile stations (MS) 130, including MSs 130a, 130b, and 130c.

The one or more BSs 110 may be any type of communication device configured to transmit and/or receive communications based on the IEEE 802.16 family of standards, many of which are known in the art. In one exemplary embodiment, the one or more BSs 110 may be connected by transmission paths 140 (TP) to a network 150. In addition, BSs 110 may be configured to communicate with one or more SSs 120, MSs 130, and/or other BSs 110 using the communication protocols on communication path 160s (CP) defined by the 802.16 family of standards. In one exemplary embodiment, BS 110 may serve as an intermediary between one or more SSs 120, MSs 130, or BSs 110 and network 150. Network 150 may be wired, wireless, or any combination thereof. Network 150 may include, for example, any combination of one or more WANs, LANs, intranets, extranets, Internet, etc.

SS 120 and MS 130 may include any type of wireless client device configured to communicate with BS 110 and/or other SSs 120 and MSs 130 using the communication protocols on CP 160 defined by the 802.16 family of standards. Each SS 120 and MS 130 may include, for example, servers, clients, mainframes, desktop computers, laptop computers, network computers, workstations, personal digital assistants (PDA), tablet PCs, scanners, telephony devices, pagers, cameras, musical devices, etc. In one exemplary embodiment, SS 120 may be a Wi-Fi device enabled to communicate with BS 110 using the communication protocols on CP 160 defined by the 802.16 family of standards.

Each BS 110 may have a broadcast range within which that BS 110 may communicate with SS 120, MS 130, and one or more other BSs 110. Broadcast ranges of each BS 110 may vary due to power levels, location, interference (physical and/or electromagnetic), etc. Similarly, each SS 120 and MS 130 may have broadcast ranges within which that SS 120 and MS 130 may communicate with one or more other SSs 120, MSs 130 and/or BSs 110. Broadcast ranges of each SS 120 and MS 130 may vary due to power levels, location, interference (physical and/or electromagnetic), etc. While the term "transmitter" may be used to refer to BS 110 and the term "receiver" may be used to refer to SS 120 and MS 130, any of BS 110, SS 120, and MS 130 may be configured to transmit and/or receive data.

In addition to the ability of each BS 110 to connect and communicate with SS 120 and MS 130, each BS 110 may also connect and communicate with one or more other BSs 110 using a line-of-sight, wireless link using the protocols and standards defined by the IEEE 802.16 family of standards. In other words, a Wi-Max network may provide two forms of wireless communication: A point-to-point (P2P) communication, e.g., between BS 110a and BS 110b, that may operate at frequencies up to 66 GHz, and a point-to-multipoint (P2MP) communication, e.g., between BS 110 and one or more SSs 120 and/or MSs 130, that may operate in the 2.0 to 11.0 GHz range. In one exemplary embodiment, P2MP communication may include so-called Mobile Wi-Max, e.g., communication between BS 110 and one or more MSs 130. Mobile Wi-Max is based on IEEE 802.16e-2005 and may operate in the 2.3 GHz, 2.5 GHz, 3.3 GHz, and 3.4-3.8 GHz spectrum bands.

The 802.16 family of standards specifies a MAC layer Time Division Multiplex (TDM) downlink coupled with a Time Division Multiple Access (TDMA) uplink. The 802.16 family of standards may also support both Time Division Duplex (TDD) and Frequency Division Duplex (FDD) operational modes. TDD is a technique in which the system may transmit and receive within the same channel, assigning time slices for transmit and receive modes. FDD, in contrast, may require two separate spectrums.

Transmission time may be divided into variable length frames. In an FDD system, the uplink, e.g., SS 120 to BS 110 or MS 130 to BS 110, and downlink, e.g., BS 110 to SS 120 or BS 110 to MS 130, sub-frames may operate on separate uplink and downlink channels. In a TDD system, each frame may be divided into a downlink sub-frame and an uplink sub-frame operating on a single channel.

TP 140 may be a transmission path that includes one or more nodes in network 100. TP 140 may be wired, wireless, or any combination of wired and/or wireless communication means and/or methods. Communication from MS 130 to BS 110 may be characterized as traveling upstream along TP 140, while communications from BS 110 to MS 130 may be characterized as traveling downstream along TP 140.

Still referring to FIG. 1, BS 110 may be configured to create and store one or more data structures associated with one or more SSs 120, MSs 130, TPs 140 and/or one or more CPs 160, as well as relationships between the data structures. For example, BS 110 may store one or more subscriber or mobile station identifiers, one or more transmission path identifiers, one or more communication path data structures, and/or one or more transmission path data structures, etc.

In addition, MS 130 may be configured to create and store one or more data structures associated with one or more BSs 110, SSs 120, MSs 130, TPs 140 and/or one or more CPs 160, as well as relationships between the data structures. For example, MS 130 may store data on all known connections, the period of threshold communication activity, power savings classes, one or more subscriber or mobile station identifiers, one or more transmission path identifiers, one or more communication path data structures, and/or one or more transmission path data structures, etc.

Figure 2A:
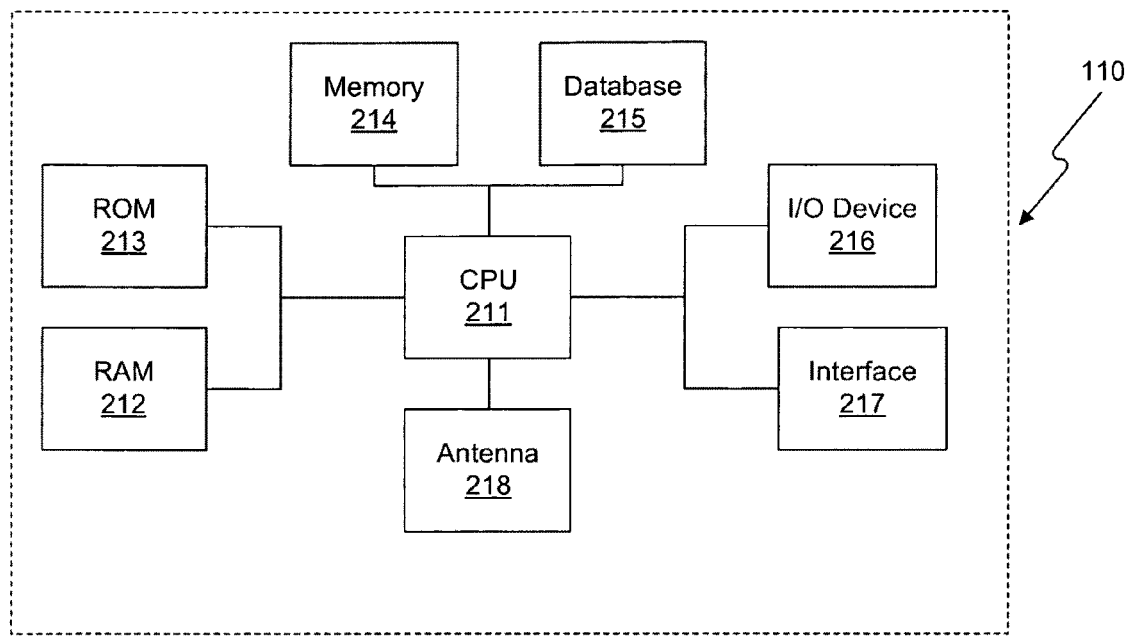
FIG. 2a is a block diagram of an exemplary Base Station, consistent with certain disclosed embodiments.

FIG. 2a is a block diagram of an exemplary structure of BS 110. As shown in FIG. 2a, BS 110 may include one or more of the following components: at least one central processing unit (CPU) 211 configured to execute computer program instructions to perform various processes and methods, random access memory (RAM) 212 and read only memory (ROM) 213 configured to access and store information and computer program instructions, memory 214 to store data and information, one or more databases 215 to store tables, lists, or other data structures, one or more input/output (I/O) devices 216, one or more interfaces 217, one or more antennas 218, etc. Each of these components is well-known in the art and will not be discussed further.

Figure 2B:
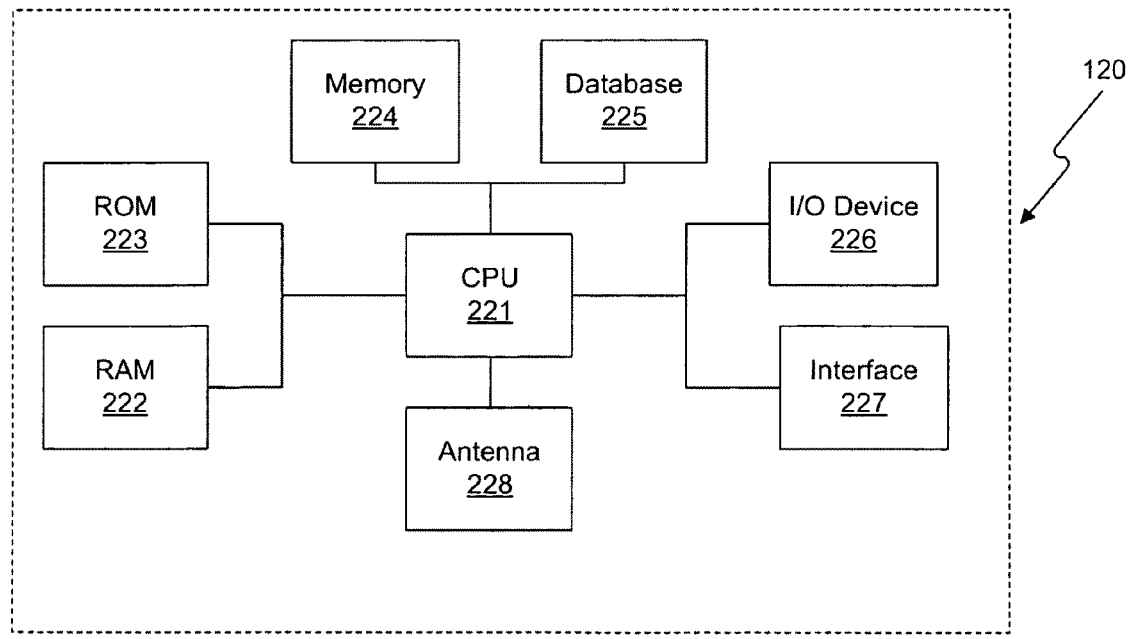
FIG. 2b is a block diagram of an exemplary Stationary Station, consistent with certain disclosed embodiments.

FIG. 2b is a block diagram of an exemplary structure of SS 120. As shown in FIG. 2b, SS 120 may include one or more of the following components: at least one CPU 221 configured to execute computer program instructions to perform various processes and methods, RAM 222 and ROM 223 configured to access and store information and computer program instructions, memory 224 to store data and information, one or more databases 225 to store tables, lists, or other data structures, one or more I/O devices 226, one or more interfaces 227, one or more antennas 228, etc. Each of these components is well-known in the art and will not be discussed further.

SS 120 may include any type of wireless client device configured to communicate with BSs 110, other SSs 120, and/or MSs 130 using one or more wireless communication standards including, for example, the IEEE 802.16 family of standards. SSs 120 may include, for example, servers, clients, mainframes, desktop computers, laptop computers, network computers, workstations, tablet PCs, scanners, telephony devices, pagers, cameras, musical devices, etc. SS 120 may be fixed and may be expected to remain in contact with the same pool of BSs 110 and SSs 120.

Figure 2C:
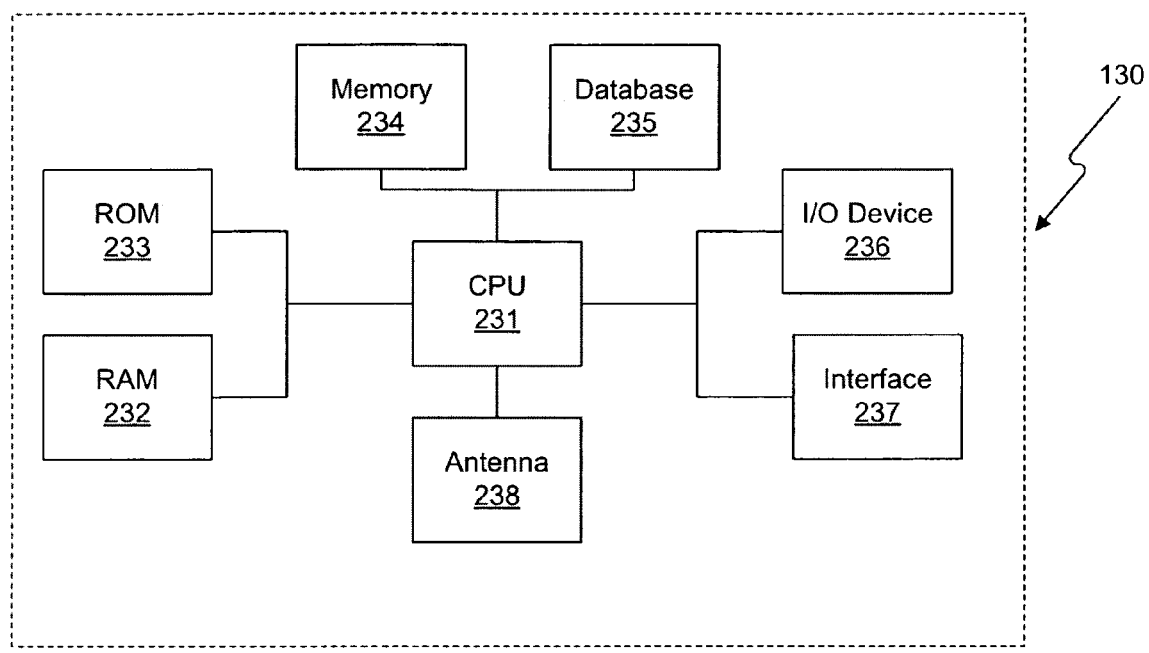
FIG. 2c is a block diagram of an exemplary Mobile Station, consistent with certain disclosed embodiments.

FIG. 2c is a block diagram of an exemplary structure of MS 130. As shown in FIG. 2c, MS 130 may include one or more of the following components: at least one CPU 231 configured to execute computer program instructions to perform various processes and methods, RAM 232 and ROM 233 configured to access and store information and computer program instructions, memory 234 to store data and information, one or more databases 235 to store tables, lists, or other data structures, one or more I/O devices 236, one or more interfaces 237, one or more antennas 238, etc. Each of these components is well-known in the art and will not be discussed further.

MS 130 may include any type of wireless client device configured to communicate with BSs 110, SSs 120, and/or other MSs 130 using one or more wireless communication standards including, for example, the IEEE 802.16 family of standards. MSs 130 may include, for example, servers, clients, mainframes, desktop computers, laptop computers, network computers, workstations, personal digital assistants (PDA), tablet PCs, scanners, telephony devices, pagers, cameras, musical devices, etc. In one exemplary embodiment, MS 130 may be a mobile computing device. In other embodiments, MS 130 may be a "non-mobile" computing device located in a mobile environment (e.g., airplanes, watercraft, buses, multi-passenger vehicles, automobiles, etc.).

Figure 3:
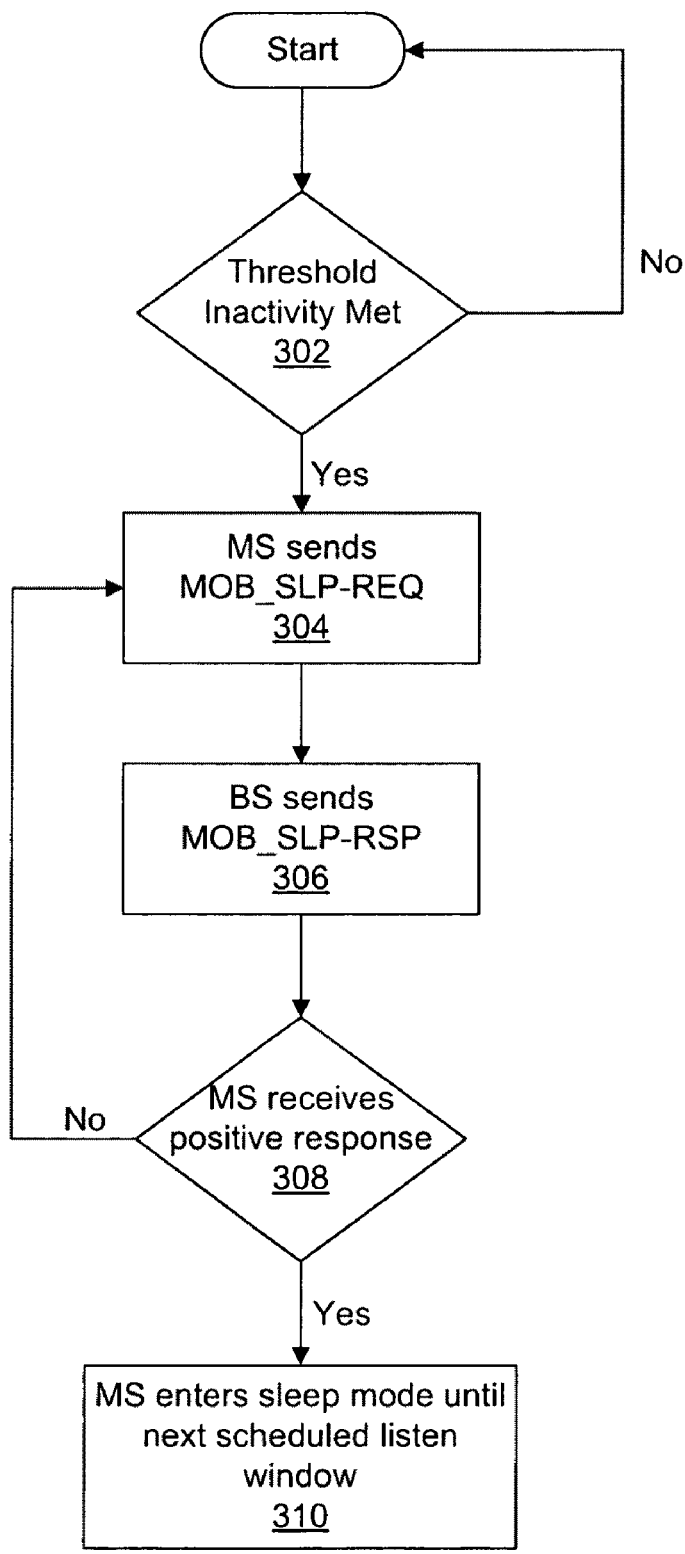
FIG. 3 is a flow chart illustrating an exemplary power saving mode request of IEEE 802.16e., consistent with certain disclosed embodiments.

FIG. 3 is a block diagram of an exemplary power saving mode request that may be made consistent with IEEE 802.16e. In step 302, MS 130 may monitor a threshold communications inactivity period and determine if a prerequisite period of threshold communication inactivity has been met. If the prerequisite period of threshold communication inactivity has not been met, MS 130 may wait for a duration, then check step 302 again. In step 304, after the prerequisite period of threshold communication inactivity has exceeded its threshold, MS 130 may send a mobile station sleep request MOB_SLP-REQ to BS 110 to negotiate a sleep window. The MOB_SLP-REQ may contain information from MS 130 necessary to implement power savings. In step 306, BS 110 may respond with a mobile station sleep response MOB_SLP-RSP including its response to the request to negotiate a sleep window from MS 130. In step 308, MS 130 may determine if the response to its sleep window request was proper and positive. If the response was not proper or positive, MS 130 may repeat step 304. If the response was proper and positive, in step 310 MS 130 may enter a power savings mode at an appropriate time.

In one exemplary embodiment, a power savings mode may include alternating sleep intervals and listen intervals. During the sleep interval MS 130 may cut off all contact with its serving BS 110 and conserve its power, or use its power for other tasks, and during the listening interval, MS 130 may wait for traffic or send out packets. The power saving mode may have several power saving classes. In one exemplary embodiment, the above noted three power savings classes of IEEE 802.16e are configured as follows. In power savings class I, sleep windows may increase in size at each sleep interval by doubling the previous sleep window until a determined maximum sleep window size is reached at which the sleep window size remains unchanged, while the listen interval may be of a fixed duration. The power saving class II may have sleep and listen intervals of fixed duration. The power saving class III may have sleep intervals set based on the expected arrival of the next portion of data or next expected ranging request. Periodically a ranging request may be used to determine the distance between a MS 130 and any BSs 110 in range of MS 130. Ranging and range requests are well known in the art and will not be further discussed.

FIG. 4 is a table listing the various classes of services supplied by IEEE 802.16e along with associated mandatory Quality of Service (QoS) parameters. Each service type may have some different and some similar characteristics, dependent on the individual connections within network 100.

The Unsolicited Grant Service (UGS) may include real-time data streams comprising fixed size data packets issued at periodic intervals. Applications of UGS may include T1/E1 and voice over IP without silence suppression. Mandatory QoS parameters for UGS may include maximum sustained traffic rate (which for UGS may equal a Minimum Reserved Traffic Rate (MRTR)), Maximum Latency, Tolerated Jitter, Request/Transmission Policy, and Unsolicited Grant Interval.

The Extended Real-Time Polling Service (ERT-VR) may include real-time service flows that generate variable-sized data packets on a periodic basis. Applications of ERT-VR may include voice over IP with silence suppression. Mandatory QoS parameters for ERT-VR may include maximum sustained traffic rate, MRTR, Maximum Latency, Request/Transmission Policy, and Unsolicited Polling Interval.

The Real-Time Polling Service (RT-VR) may include real-time data streams comprising variable-sized data packets that are issued at periodic intervals. Applications of RT-VR may include MPEG video. Mandatory QoS parameters for RT-VR may include maximum sustained traffic rate, MRTR, Maximum Latency, Traffic Priority, Request/Transmission Policy, and Unsolicited Polling Interval.

The Non-Real-Time Polling Service (NRT-VR) may include delay tolerant data streams comprising variable-sized data packets for which minimum data rates are required. Applications of NRT-VR may include FTP. Mandatory QoS parameters for NRT-VR may include maximum sustained traffic rate, MRTR, Traffic Priority, and Request/Transmission Policy.

The Best Effort Service (BE) may include data streams for which no minimum service level is required and therefore may be handled on a space-available basis. Applications of BE may include HTTP. Mandatory QoS parameters for BE may include maximum sustained traffic rate, Traffic Priority, and Request/Transmission Policy.

QoS, QoS service types, mandatory QoS parameters, and QoS implementations are well known in the art and will not be discussed further except as necessary for the disclosed embodiments.

Figure 5A:
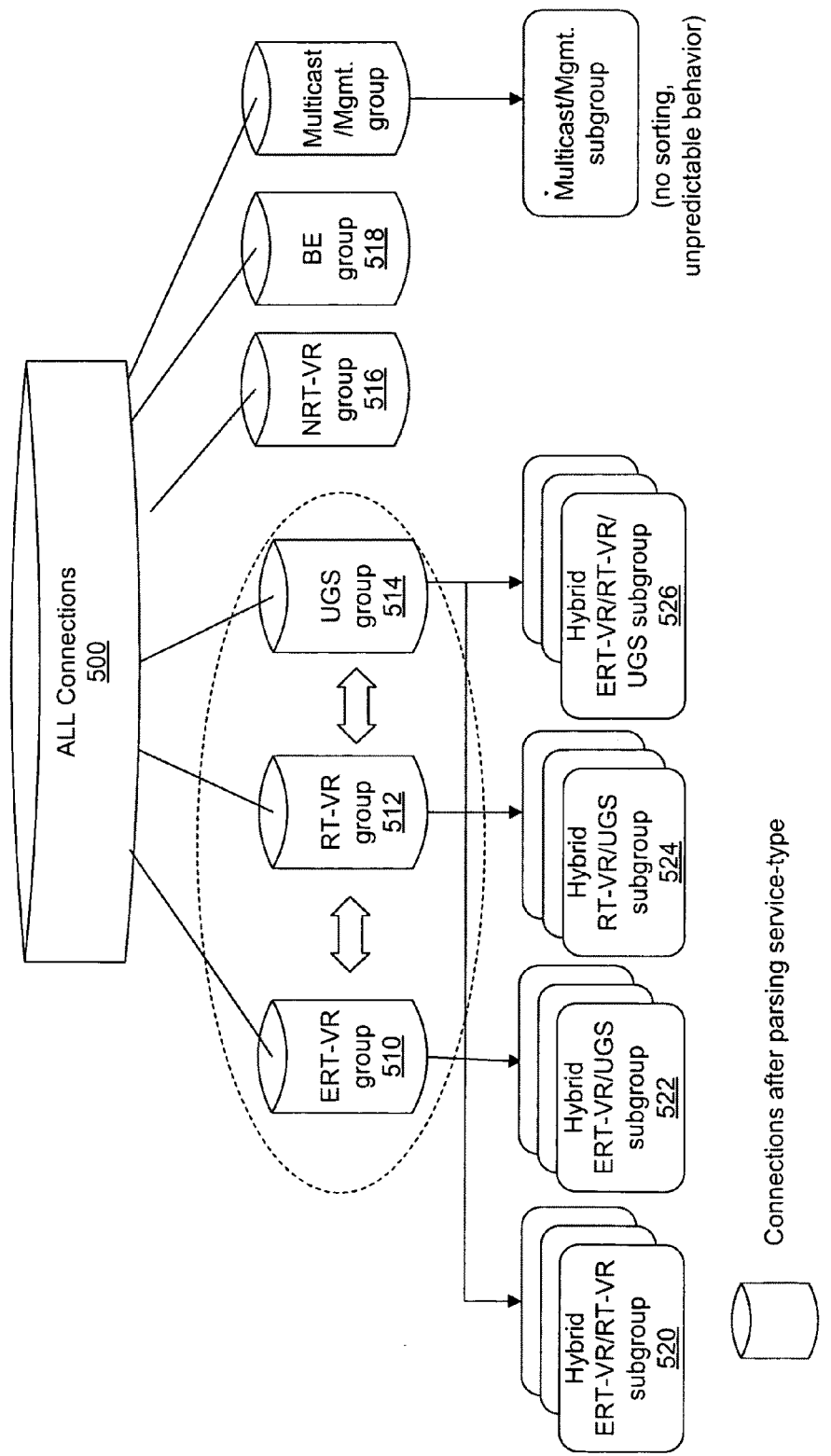
FIG. 5a is an exemplary horizontal sorting diagram, consistent with certain disclosed embodiments.

FIG. 5a is an exemplary horizontal sorting diagram that shows selection of connections 500 with common performance characteristics to create a plurality of power savings classes. A hierarchical sorting method based on the QoS parameters of the respective service types may be used to create the power savings classes. First, all of connections 500 are sorted based on their service types to have different classes of QoS type, for example, e.g., ERT-VR 510, RT-VR 512, and UGS 514 groups. The different groups of QoS types may then be sorted into two groups: real-time traffic groups 510, 512, and 514 and non-real-time traffic groups 516 and 518. Real-time and non-real-time traffic are well defined in the art. The real-time connections may be horizontally sorted based on their common parameters to form hybrid subgroup classes 520, 522, 524, and 526, which may be grouped independent of their service type. In one exemplary embodiment, the common parameter for sorting may be the maximum latency. In other exemplary embodiments, other common parameters may be used to form hybrid subgroup classes 520, 522, 524, and 526. A given hybrid subgroup class 520, 522, 524, or 526 may contain two or more of the real-time QoS types, for example UGS 514 and ERT-VR 510 or ERT-VR 510 and RT-VR 512 regrouped in the same hybrid subgroup class 520, 522, 524, or 526.

In one exemplary embodiment, grouping hybrid power savings classes based on key parameters may include sorting by including a proposed member in hybrid power savings class when maximum latencies (ML) are equal and all polling intervals (PI) and grant intervals (GI) are equal or integer multiples of each other. The relationship between the maximum latency and the polling interval or grant interval for a hybrid power class may be expressed as: $ML = k*(PI \text{ or } GI)$, where k is a positive integer.

Figure 5B:
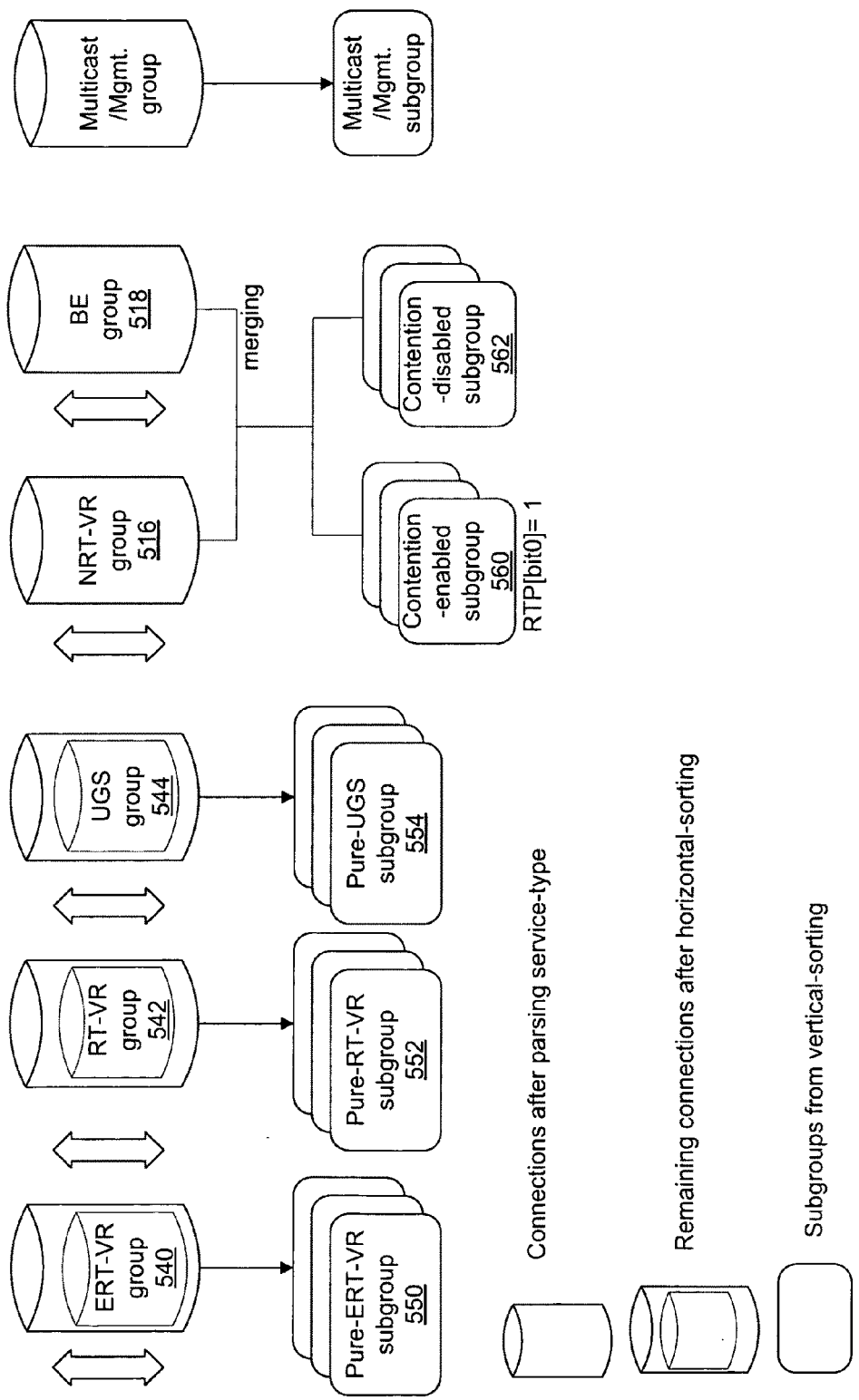
FIG. 5b is an exemplary vertical sorting diagram, consistent with certain disclosed embodiments.

In FIG. 5b, after comparing different QoS type connections to extract the ones with common traffic behaviors to form hybrid subgroups 520, 522, 524, and 526, the remaining connections derived from each category of QoS type connections may be called a pure class 540, 542, and 544 for each QoS type. Each pure class 540, 542, or 544 may be sorted with vertical sorting. Vertical sorting in each of the pure classes 540, 542, or 544 may be performed by selecting for membership in a pure subgroup 550, 552, and 554 connections with maximum latencies (ML) that are equal or integer multiples of each other and all polling intervals (PI) and grant intervals (GI) are equal or integer multiples of each other. Thus, in a case in which one connection's ML is a multiple of another connection's ML and their GI or PI are also multiples, the connection having the smallest ML can determine the sleeping/listening window. Accordingly, in one exemplary embodiment, the following rule can be applied: $|ML1 - ML2| = k*\min(ML1, ML2)$, where k is a positive integer, and ML1 and ML2 are the respective latencies of two connections.

In the present embodiment, the non-real-time connections are NRT-VR 516 and BE 518 groups. The non-real-time connections may be sorted vertically based on the status of an urgent bit to create two groups within every non-real-time QoS type (NRT-VR and BE). An urgent bit may be one of the bits in the request/transmission policy, such as bit #7, which is reserved under IEEE 802.16e. The non-real-time vertically sorted groups may then be merged by horizontally sorting into a contention-enabled subgroup 560 and a contention-disabled subgroup 562, based on the urgent bit value, to have two distinct non-real-time power savings classes.

The selecting of connections with common performance characteristics to create a plurality of power savings classes shown in FIG. 5a and FIG. 5b may produce sorted power savings classes including: UGS, (UGS, RT-VR), (UGS, RT-VR, ERT-VR), (UGS, ERT-VR), ERT-VR, (ERT-VR, RT-VR), RT-VR, NRT-VR, (NRT-VR, BE), BE, Multicast & Management connections.

The above discussion is one exemplary embodiment for selecting connections with common performance characteristics to create a plurality of power savings classes. Other QoS parameters, other groupings and subgroupings, and other schemes may be used to achieve other subdivisions of the QoS types into power savings classes with similar performance characteristics.

After selecting connections with common performance characteristics to create a plurality of power savings classes respectively composed of connections with similar characteristics, a power savings window size is determined for each power savings class. Determining a power savings window size for each power savings class may be called attribution. Desirably, the power savings window sizes are determined to decrease power consumption and maintain QoS performance levels. The determination of power savings window sizes includes determining the sizes of listening windows and sleep windows. In a non-real-time power savings class, the listening window may be to only receive the traffic indication from BS 110. The listening window of any of the real-time power savings classes should allow the connection to send and receive packets.

The power savings window size for a UGS pure power savings class may be determined from the connection with the smallest Maximum Latency (ML). The listening window is determined to have a length corresponding to the longest tolerated jitter of any connection in the UGS pure power savings class. The sleep window is the remainder of the smallest ML after subtraction of the longest tolerated jitter. One exemplary embodiment is illustrated in FIG. 6, which is an exemplary diagram including a horizontal time axis, illustrating determination of the sleep and listen windows for a UGS pure power savings class according to their maximum latencies and jitters. CID-1 (Connection Identifier-1) is a member of a UGS pure power savings class, and CID-2 is another member of the UGS pure power savings class. The longest jitter, i.e., Jitter 2 of CID-2, is the listening window of the UGS pure power savings class (PSC), and the remainder of the smallest ML, i.e., ML1 of CID-1, is the sleep window of the UGS pure power savings class (PSC).

Figure 7:
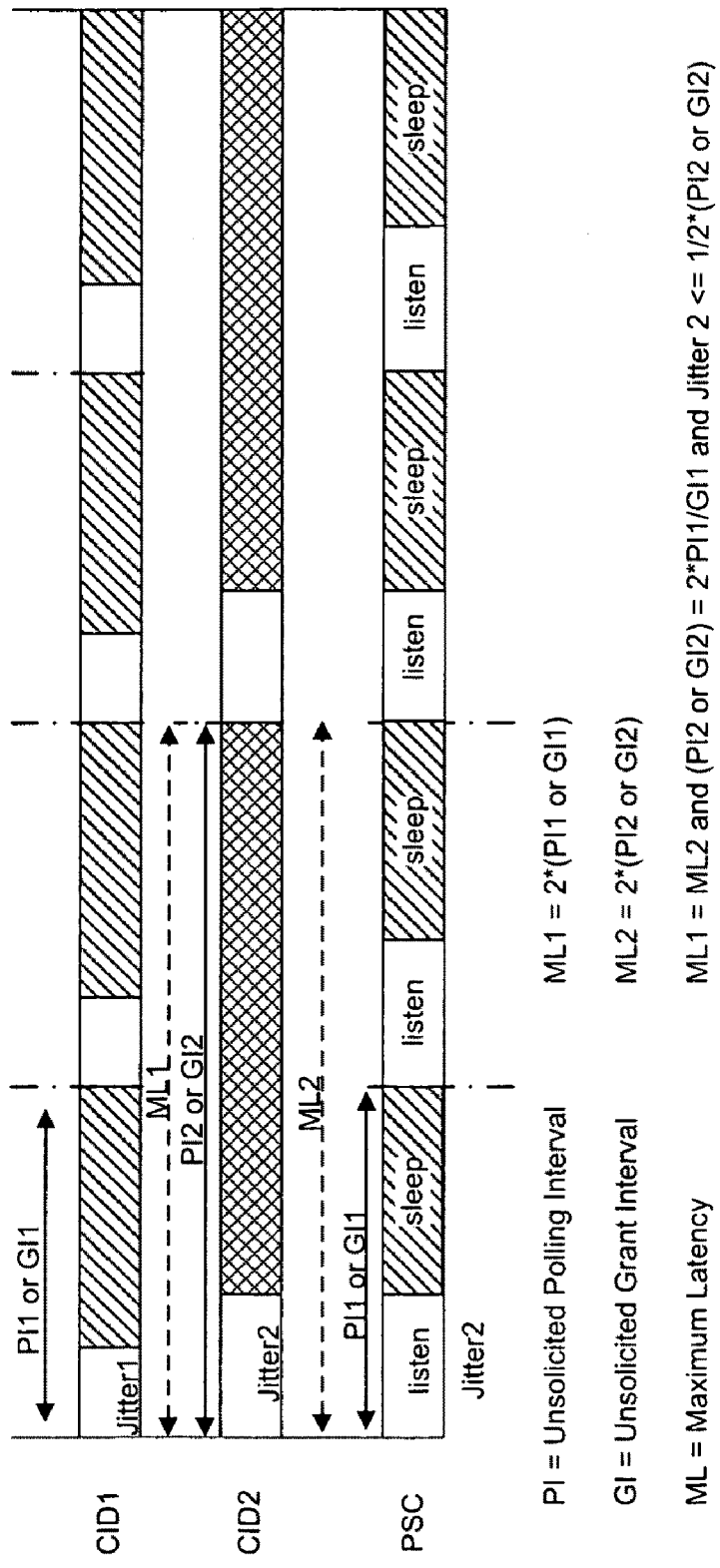
FIG. 7 is an exemplary diagram including a horizontal time axis, illustrating determination of sleep and listen windows for a hybrid power savings class according to maximum latencies and polling/grant intervals, consistent with certain disclosed embodiments.

The power savings window size for a UGS hybrid power savings class without RT-VR, i.e., the (UGS, ERT-VR) class, may be determined from the length of the longest tolerated jitter. In one exemplary embodiment, the ERT-VR class members all have a tolerated jitter. The listening window is determined to have a length corresponding to the longest tolerated jitter, and the sleep window has a length corresponding to the remainder of the shortest unsolicited grant interval after subtraction of the longest tolerated jitter. In another exemplary embodiment, some of the ERT-VR class members have no tolerated jitter. The longest tolerated jitter may have added thereto a number of frames that allow bandwidth requests and sending of packets at maximum rate. However, the total length of the listening window should be no more than one-half the smallest ML. One exemplary embodiment is illustrated in FIG. 7, which is an exemplary diagram including a horizontal time axis, illustrating determination of the sleep and listen windows for a hybrid power savings class according to their maximum latencies and unsolicited polling/grant intervals. CID-1 (Connection Identifier-1) is a member of a UGS hybrid power savings class without RT-VR, and CID-2 is another member of the UGS hybrid power savings class without RT-VR. The longest jitter, i.e., Jitter 2, is the listening window of the UGS hybrid power savings class (PSC) without RT-VR, and the remainder of the shortest unsolicited grant/polling interval, i.e., grant/polling interval 1, is the sleep window of the UGS hybrid power savings class (PSC) without RT-VR, designated as "sleep" of the PSC of FIG. 7. The length of the listening window plus the length of the sleep window is constrained to the length of the shortest unsolicited polling/grant interval to increase the opportunities to send packets or request bandwidth to better meet the requirements of throughput of the different QoS connections.

The power savings window size for a ERT-VR pure power savings class may be determined from the connection with the smallest ML. In one exemplary embodiment, the ERT-VR class members all have a tolerated jitter. The listening window is determined to have a length corresponding to the longest tolerated jitter of any connection in the ERT-VR pure power savings class. In another exemplary embodiment, some of the ERT-VR class members have no tolerated jitter. The longest tolerated jitter may have added thereto a number of frames that allow bandwidth requests and sending of packets at maximum rate. However, the total length of the listening window should be no more than one-half the smallest ML. The sleep window is the remainder of the smallest ML after subtraction of the longest tolerated jitter. One exemplary embodiment is illustrated in FIG. 6, where the sleep and listen windows for a ERT-VR pure power savings class are determined according to their maximum latencies and jitters. CID-1 (Connection Identifier-1) is assumed to be a member of a ERT-VR pure power savings class, and CID-2 is another member of the ERT-VR pure power savings class, both having tolerated jitters. The longest jitter, i.e., Jitter 2 of CID-2, is the listening window of the ERT-VR pure power savings class (PSC), and the remainder of the smallest ML, i.e., ML1 of CID-1, is the sleep window of the ERT-VR pure power savings class (PSC).

In determining the power savings window size for a RT-VR pure power savings class, there is no jitter to adjust a bandwidth (BW) grant time, and a BW request frame should be sent. The number of frames needed for uplink service may be determined from the Minimum Reserved Traffic Rate (at least one frame to get the grant and another frame for the uplink). The number of frames needed for uplink service is added to the bandwidth request frame to determine the listening window. The total length of the listening window should be no more than one-half the smallest ML. The sleep window is determined to have a length corresponding to the remainder of the smallest ML after subtraction of the listening window.

The power savings window size for a RT-VR hybrid power savings class, i.e., with UGS and/or ERT-VR class members, may be determined from the longest tolerated jitter size of the UGS and/or ERT-VR connections and the number of frames needed to send a packet for the RT-VR class member (from Minimum Reserved Traffic Rate) to determine the listening window. The total length of the listening window should be no more than one-half the shortest unsolicited polling/grant interval. The sleep window is determined to have a length corresponding to the remainder of the shortest unsolicited polling/grant interval after subtraction of the listening window.

The power savings window size for a NRT-VR power savings class may be determined from the bandwidth contention capacity to initialize the sleep window. In one exemplary embodiment, when an urgent bit, such as bit #7 (reserved under IEEE 802.16e), is set or toggled to the urgent setting, the sleep window should start with a smaller size than when it is not set or toggled to the urgent setting. In one exemplary embodiment, for a NRT-VR power savings class with the urgent bit set or toggled to the urgent setting, the sleep window may initially be set with 2 to 6 frames. The NRT-VR power savings class with the urgent bit not set or toggled to urgent may initially be set with a sleep window of more than 6 frames. The listening window size to receive traffic indication from BS 110 may be no more than 2 frames.

The power savings window size for a BE power savings class may be determined from the bandwidth contention capacity to initialize the sleep window. In one exemplary embodiment, when an urgent bit, such as bit #7 (reserved under IEEE 802.16e), is set or toggled to the urgent setting, the sleep window should start with a smaller window size than when the urgent bit is not set or toggled to the urgent setting. In one exemplary embodiment, for a BE power savings class with the urgent bit set or toggled to the urgent setting, the sleep window may initially be set with 2 to 6 frames. The BE power savings class with the urgent bit not set or toggled to urgent may initially be set with a sleep window of more than 6 frames. The listening window size to receive traffic indication from BS 110 may be no more than 2 frames.

The power savings window size for a Multicast and Management connections power savings class is determined from the minimum of the next frame offset time and/or next periodic ranging to determine the listening window and sleep window.

Figure 8:
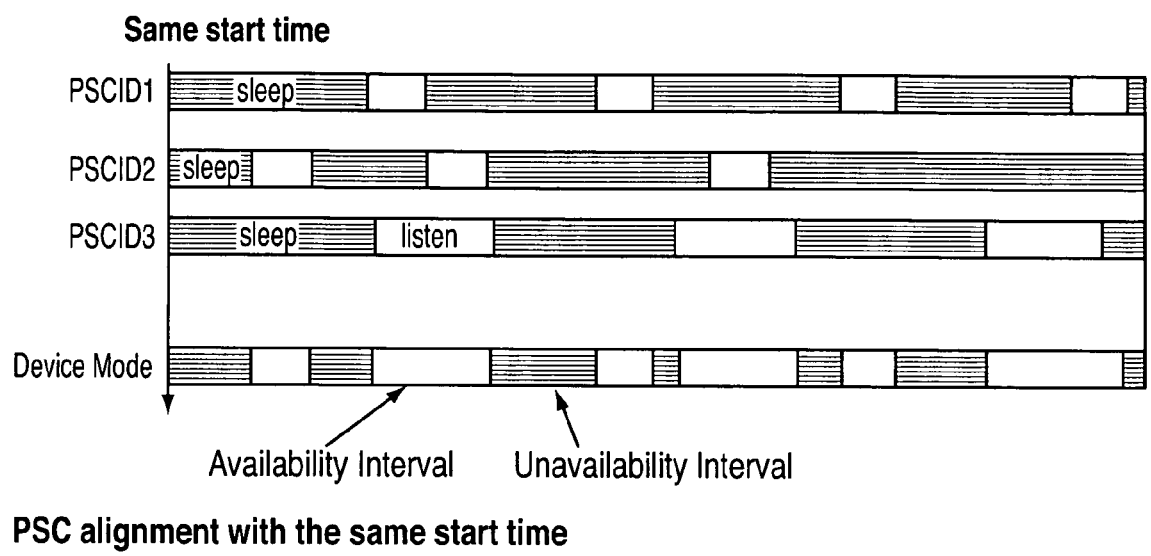
FIG. 8 is an exemplary diagram including a horizontal time axis, illustrating available and unavailable intervals of a mobile device based on sleep and listen windows of multiple power savings classes, consistent with certain disclosed embodiments.

FIG. 8 is an exemplary diagram including a horizontal time axis, illustrating available and unavailable intervals of a mobile device, e.g. MS 130, based on sleep and listen windows of multiple power savings classes. More particularly, FIG. 8 shows an exemplary embodiment in which all of the power savings classes with the same start time being aligned. PSCID-1 (Power Savings Class Identifier-1) may have alternating sleep and listen windows. Similarly, PSCID-2 and PSCID-3 may also have sleep and listen windows. MS 130 may have a device mode as long as the power savings classes are active, where the device mode is available or unavailable. When all of the Power Savings Classes are in sleep windows, the device will be unavailable, and when one or more of the power savings classes are in listening windows, the device will be available.

Other approaches may be used for attribution of the pure and hybrid power savings classes, such as grouping hybrid groups according to MLs which are equal or integer multiples of each other instead of only equal, and for window attribution, the listening window can be determined using the average jitter.

Once the power savings window sizes have been attributed to each power savings class, power savings classes with similar power savings window sizes and repetition rate may be aligned to form an aligned power savings class.

Once the connections with common performance characteristics have been selected, a power savings window attributed to each power savings class, and power savings classes have been aligned, the plurality of power savings classes, each associated power savings window size, and the aligned power savings class may be communicated to BS 110. In another exemplary embodiment, MS 130 may manage its own power management, and not communicate the plurality of power savings classes, each associated power savings window size, and the aligned power savings class to BS 110. In a further exemplary embodiment, only the plurality of power savings classes and each associated power savings window size may be communicated to BS 110.

The disclosed approach may include choosing some key parameters after an in-depth analysis of mandatory QoS parameters to regroup the connections when their common key parameters match. The approach may consecutively sort connections based on a key parameter after a first classification according to their QoS type. The approach may create power savings classes which are not only based on QoS type, but include connection specific needs (latency, BW granting time etc) for a power saving system. Each of these power savings classes may have their different windows size attributed according to the sorting results.

It will be apparent to those skilled in the art that various modifications and variations can be made in the system and method for power savings in a wireless communications network. It is intended that the standard and examples be considered as exemplary only, with a true scope of the disclosed embodiments being indicated by the following claims and their equivalents.

The invention claimed is:

1. A method for power savings in a wireless communications network, comprising:
   selecting one or more connections with common performance characteristics to create a plurality of power savings classes;
   attributing a power savings window size to each power savings class;
   aligning sleep windows of the plurality of power savings classes with a same start time to generate a plurality of aligned power savings classes; and
   communicating the plurality of power savings classes and each associated power savings window size to a base station.

2. The method as in claim 1, including:
   monitoring a threshold communications inactivity period;
   determining if the threshold communications inactivity period exceeds a threshold; and
   initiating the selecting and the attributing when the threshold communications inactivity period exceeds the threshold.

3. The method as in claim 1, wherein selecting connections with common performance characteristics further includes:
   sorting connections by real-time connections or non-real-time connections;
   horizontally sorting the real-time connections into hybrid power savings classes and pure power savings classes, including:
      grouping the hybrid power savings classes based on key parameters; and
      vertically sorting the pure power savings classes based on key parameters; and
   vertically sorting the non-real-time connections into vertical non-real-time power savings classes, including:
      horizontally sorting the vertical non-real-time power savings classes based on an urgency bit to create two non-real-time power savings classes.

4. The method as in claim 3, wherein the grouping of hybrid power savings classes based on key parameters further includes:
   determining a maximum latency for each proposed member of the hybrid power savings class;
   determining one of a polling interval or a grant interval for each proposed member of the hybrid power savings class;
   determining when one or more of the maximum latencies for all proposed members of the hybrid power savings class are equal;
   determining when one or more of the polling intervals or the grant intervals for all proposed members of the hybrid power savings class are equal or integer multiples of each other; and
   including the proposed member in the hybrid power savings class when the maximum latencies are equal and all polling intervals and grant intervals are equal or integer multiples of each other.

5. The method as in claim 4, wherein the vertically sorting of the pure power savings classes based on key parameters further includes:
   determining the maximum latency for each proposed member of the pure power savings class;
   determining when one or more of the maximum latencies for all proposed members of the pure power savings class are equal or integer multiples of each other;
   determining a smallest maximum latency; and
   using the smallest maximum latency to determine a sleep window and a listening window.

6. The method as in claim 5, wherein the vertically sorting of the pure power savings classes based on key parameters further includes:
   determining if a tolerated jitter is defined for one or more of the members of the pure power savings class;
   determining if a longest tolerated jitter is smaller than or equal to one-half of the smallest maximum latency for the proposed members of the pure power savings class; and
   using, when the longest tolerated jitter is defined for all of the members of the pure power savings class and the tolerated jitter is smaller than or equal to one-half of the smallest maximum latency of the pure power savings class, the longest tolerated jitter as the listening window for the pure power savings class.

7. The method as in claim 6, wherein the attributing of a power savings window size to each power savings class includes:
   determining, from the connection with a smallest maximum latency, the power savings window size for a UGS pure power savings class, by setting the listening window as the longest tolerated jitter, and setting the sleep window as the remainder of the smallest maximum latency after subtracting the longest tolerated jitter;
   determining, from the length of the longest tolerated jitter, the power savings window size for a UGS hybrid power savings class without RT-VR, by setting the longest tolerated jitter equal to the listening window, and setting the sleep window equal to the remainder of the shortest unsolicited grant interval after subtracting the longest tolerated jitter;

determining, from the connection with the smallest maximum latency, the power savings window size for an ERT-VR pure power savings class, when all power savings class members have a tolerated jitter, by setting the listening window as the longest tolerated jitter, and setting the sleep window as the remainder of the smallest maximum latency after subtracting the longest tolerated jitter;

determining, from the connection with the smallest maximum latency, the power savings window size for the ERT-VR pure power savings class, when not all power savings class members have a tolerated jitter, by adding a number of frames needed to send a maximum rate of packets to a bandwidth request frame to determine the listening window, and setting the sleep window as the remainder of the smallest maximum latency after subtracting the listening window;

determining, from utilizing a minimum reserved traffic rate, the power savings window size for an RT-VR pure power savings class, by adding a number of frames needed for uplink service to a bandwidth request frame to determine the listening window and setting the sleep window as the remainder of the smallest maximum latency after subtracting the listening window;

determining, from the tolerated jitter size and the number of frames needed to send a packet, from utilizing the minimum reserved traffic rate, the power savings window size for an RT-VR hybrid power savings class to determine the listening window;

determining, from a bandwidth contention capacity, the power savings window size for an NRT-VR power savings class to initialize the sleep window;

determining, from a bandwidth contention capacity, the power savings window size for a BE power savings class to initialize the sleep window; and determining, from the minimum of a next frame offset time and a next periodic ranging time, the power savings window size for a multicast and management connections power savings class to determine the sleep window.

8. The method as in claim 1, wherein the connections includes QoS classes of UGS, ERT-VR, RT-VR, NRT-VR, BE, and multicast and management connections, where UGS, ERT-VR, RT-VR are real-time connections and NRT-VR and BE are non-real-time connections.

9. A wireless communication mobile station for wireless communication, the wireless communication mobile station comprising:
at least one memory to store data and instructions; and
at least one processor configured to access the memory and configured to, when executing the instructions:
determine a number and type of connections;
select one or more of the connections with common performance characteristics to create a plurality of power savings classes;
attribute a power savings window size to each power savings class;
align sleep windows of the plurality of power savings classes, with a same start time, to generate an aligned power savings class; and
communicate the plurality of power savings classes and each associated power savings window size to a base station.

10. The wireless communication mobile station as in claim 9, wherein the at least one processor is further configured to execute instructions including:
monitoring a threshold communications inactivity period;
determining if the threshold communications inactivity period exceeds a threshold; and
initiating the selecting and the attributing when the threshold communications inactivity period exceeds the threshold.

11. The wireless communication mobile station as in claim 9, wherein when executing the instructions, selecting connections with common performance characteristics includes:
sorting connections by real-time connections or non-real-time connections;
horizontally sorting the real-time connections into hybrid power savings classes and pure power savings classes, including:
grouping the hybrid power savings classes based on key parameters; and
vertically sorting the pure power savings classes based on key parameters; and
vertically sorting the non-real-time connections into vertical non-real-time power savings classes, including:
horizontally sorting the vertical non-real-time power savings classes based on an urgency bit to create two non-real-time power savings classes.

12. The wireless communication mobile station as in claim 11, wherein when executing the instructions, the grouping of hybrid power savings classes based on key parameters includes:
determining a maximum latency for each proposed member of the hybrid power savings class;
determining one of a polling interval or a grant interval for each proposed member of the hybrid power savings class;
determining when one or more of the maximum latencies for all proposed members of the hybrid power savings class are equal;
determining when one or more of the polling intervals or the grant intervals for all proposed members of the hybrid power savings class are equal or integer multiples of each other; and
including the proposed member in the hybrid power savings class when the maximum latencies are equal and all polling intervals and grant intervals are equal or integer multiples of each other.

13. The wireless communication mobile station as in claim 12, wherein when executing the instructions, the vertically sorting of the pure power savings classes based on key parameters includes:
determining the maximum latency for each proposed member of the pure power savings class;
determining when one or more of the maximum latencies for all proposed members of the pure power savings class are equal or integer multiples of each other;
determining a smallest maximum latency; and
using the smallest maximum latency to determine a sleep window and a listening window.

14. The wireless communication mobile station as in claim 13, wherein when executing the instructions, the vertically sorting of the pure power savings classes based on key parameters further includes:
determining if a tolerated jitter is defined for one or more of the members of the pure power savings class;

determining if a longest tolerated jitter is smaller than or equal to one-half of the smallest maximum latency for the proposed members of the pure power savings class; and using, when the tolerated jitter is defined for all of the members of the pure power savings class and the tolerated jitter is smaller than or equal to one-half of the smallest maximum latency of the pure power savings class, the longest tolerated jitter as the listening window for the pure power savings class.

15. The wireless communication mobile station as in claim 14, wherein when executing the instructions, the attributing of a power savings window size to each power savings class includes:

determining, from the connection with the smallest maximum latency, the power savings window size for a UGS pure power savings class, by setting the listening window as the longest tolerated jitter, and setting the sleep window as the remainder of the smallest maximum latency after subtracting the longest tolerated jitter;

determining, from the length of the longest tolerated jitter, the power savings window size for a UGS hybrid power savings class without RT-VR, by setting the longest tolerated jitter equal to the listening window, and setting the sleep window equal to the remainder of the shortest unsolicited grant interval after subtracting the longest tolerated jitter;

determining, from the connection with the smallest maximum latency, the power savings window size for an ERT-VR pure power savings class, when all power savings class members have a tolerated jitter, by setting the listening window as the longest tolerated jitter, and setting the sleep window as the remainder of the smallest maximum latency after subtracting the longest tolerated jitter;

determining, from the connection with the smallest maximum latency, the power savings window size for the ERT-VR pure power savings class, when not all power savings class members have a tolerated jitter, by adding a number of frames needed to send a maximum rate of packets to a bandwidth request frame to determine the listening window, and setting the sleep window as the remainder of the smallest maximum latency after subtracting the listening window;

determining, from utilizing a minimum reserved traffic rate, the power savings window size for an RT-VR pure power savings class, by adding a number of frames needed for uplink service to a bandwidth request frame to determine the listening window and setting the sleep window as the remainder of the unsolicited polling interval after subtracting the listening window;

determining, from the tolerated jitter size and the number of frames needed to send a packet, from utilizing the minimum reserved traffic rate, the power savings window size for an RT-VR hybrid power savings class to determine the listening window;

determining, from a bandwidth contention capacity, the power savings window size for an NRT-VR power savings class to initialize the sleep window;

determining, from a bandwidth contention capacity, the power savings window size for a BE power savings class to initialize the sleep window; and determining, from the minimum of a next frame offset time and a next periodic ranging time, the power savings window size for a multicast and management connections power savings class to determine the sleep window.

16. The wireless communication mobile station as in claim 9, wherein the connections includes QoS classes of UGS, ERT-VR, RT-VR, NRT-VR, BE, and multicast and management connections, where UGS, ERT-VR, RT-VR are real-time connections and NRT-VR and BE are non-real-time connections.

17. A computer-readable medium including instructions for performing a method, when executed by a processor, for power savings in a wireless communications network, the method comprising:

determining a number and type of connections;

selecting one or more of the connections with common performance characteristics to create a plurality of power savings classes;

attributing a power savings window size to each power savings class;

aligning sleep windows of the plurality of power savings classes, with a same start time, to generate an aligned power savings class; and communicating the plurality of power savings classes and each associated power savings window size to a base station.

18. The computer-readable medium as in claim 17, wherein the at least one processor is further configured to execute instructions including:

monitoring a threshold communications inactivity period;

determining if the threshold communications inactivity period exceeds a threshold; and initiating the selecting and the attributing when the threshold communications inactivity period exceeds the threshold.

19. The computer-readable medium as in claim 17, wherein selecting connections with common performance characteristics includes:

sorting connections by real-time connections or non-real-time connections;

horizontally sorting the real-time connections into hybrid power savings classes and pure power savings classes, including:

grouping the hybrid power savings classes based on key parameters, including:

determining a maximum latency for each proposed member of the hybrid power savings class;

determining one of a polling interval or a grant interval for each proposed member of the hybrid power savings class;

determining when one or more of the maximum latencies for all proposed members of the hybrid power savings class are equal;

determining when one or more of the polling intervals or the grant intervals for all proposed members of the hybrid power savings class are equal or integer multiples of each other; and including the proposed member in the hybrid power savings class when the maximum latencies are equal and all polling intervals and grant intervals are equal or integer multiples of each other;

vertically sorting pure power savings classes based on key parameters, including:

determining the maximum latency for each proposed member of the pure power savings class;

determining when one or more of the maximum latencies for all proposed members of the pure power savings class are equal or integer multiples of each other;

determining a smallest maximum latency; and using the smallest maximum latency to determine a sleep window and a listening window;

vertically sorting the non-real-time connections into vertical non-real-time power savings classes, including:
horizontally sorting the vertical non-real-time power savings classes based on an urgency bit to create two non-real-time power savings classes.

20. The computer-readable medium as in claim 19, wherein vertically sorting the pure power savings classes based on key parameters further includes:
determining if a tolerated jitter is defined for one or more of the members of the pure power savings class;
determining if a longest tolerated jitter is smaller than or equal to one-half of the smallest maximum latency for the proposed members of the pure power savings class; and
using, when the tolerated jitter is defined for all of the members of the pure power savings class and the tolerated jitter is smaller than or equal to one-half of the smallest maximum latency of the pure power savings class, the longest tolerated jitter as the listening window for the pure power savings class.

21. The computer-readable medium as in claim 20, wherein the attributing of a power savings window size to each power savings class includes:
determining, from the connection with a smallest maximum latency, the power savings window size for a UGS pure power savings class, by setting the listening window as the longest tolerated jitter, and setting the sleep window as the remainder of the smallest maximum latency after subtracting the longest tolerated jitter;
determining, from the length of the longest tolerated jitter, the power savings window size for a UGS hybrid power savings class without RT-VR, by setting the longest tolerated jitter equal to the listening window, and setting the sleep window equal to the remainder of the shortest unsolicited grant interval after subtracting the longest tolerated jitter;
determining, from the connection with the smallest maximum latency, the power savings window size for an ERT-VR pure power savings class, when all power savings class members have a tolerated jitter, by setting the listening window as the longest tolerated jitter, and setting the sleep window as the remainder of the smallest maximum latency after subtracting the longest tolerated jitter;
determining, from the connection with the smallest maximum latency, the power savings window size for the ERT-VR pure power savings class, when not all power savings class members have a tolerated jitter, by adding a number of frames needed to send a maximum rate of packets to a bandwidth request frame to determine the listening window, and setting the sleep window as the remainder of the smallest maximum latency after subtracting the listening window;
determining, from utilizing a minimum reserved traffic rate, the power savings window size for an RT-VR pure power savings class, by adding a number of frames needed for uplink service to a bandwidth request frame to determine the listening window and setting the sleep window as the remainder of the smallest maximum latency after subtracting the listening window;
determining, from the tolerated jitter size and the number of frames needed to send a packet, from utilizing the minimum reserved traffic rate, the power savings window size for an RT-VR hybrid power savings class to determine the listening window;
determining, from a bandwidth contention capacity, the power savings window size for an NRT-VR power savings class to initialize the sleep window;
determining, from a bandwidth contention capacity, the power savings window size for a BE power savings class to initialize the sleep window; and
determining, from the minimum of a next frame offset time and a next periodic ranging time, the power savings window size for a multicast and management connections power savings class to determine the sleep window.

22. The computer-readable medium as in claim 17, wherein the connections includes QoS classes of UGS, ERT-VR, RT-VR, NRT-VR, BE, and multicast and management connections, where UGS, ERT-VR, RT-VR are real-time connections and NRT-VR and BE are non-real-time connections.

* * * * *